Dec. 25, 1923.
C. D. MILLER
WIND DEFLECTOR
Filed March 21, 1922
1,478,671
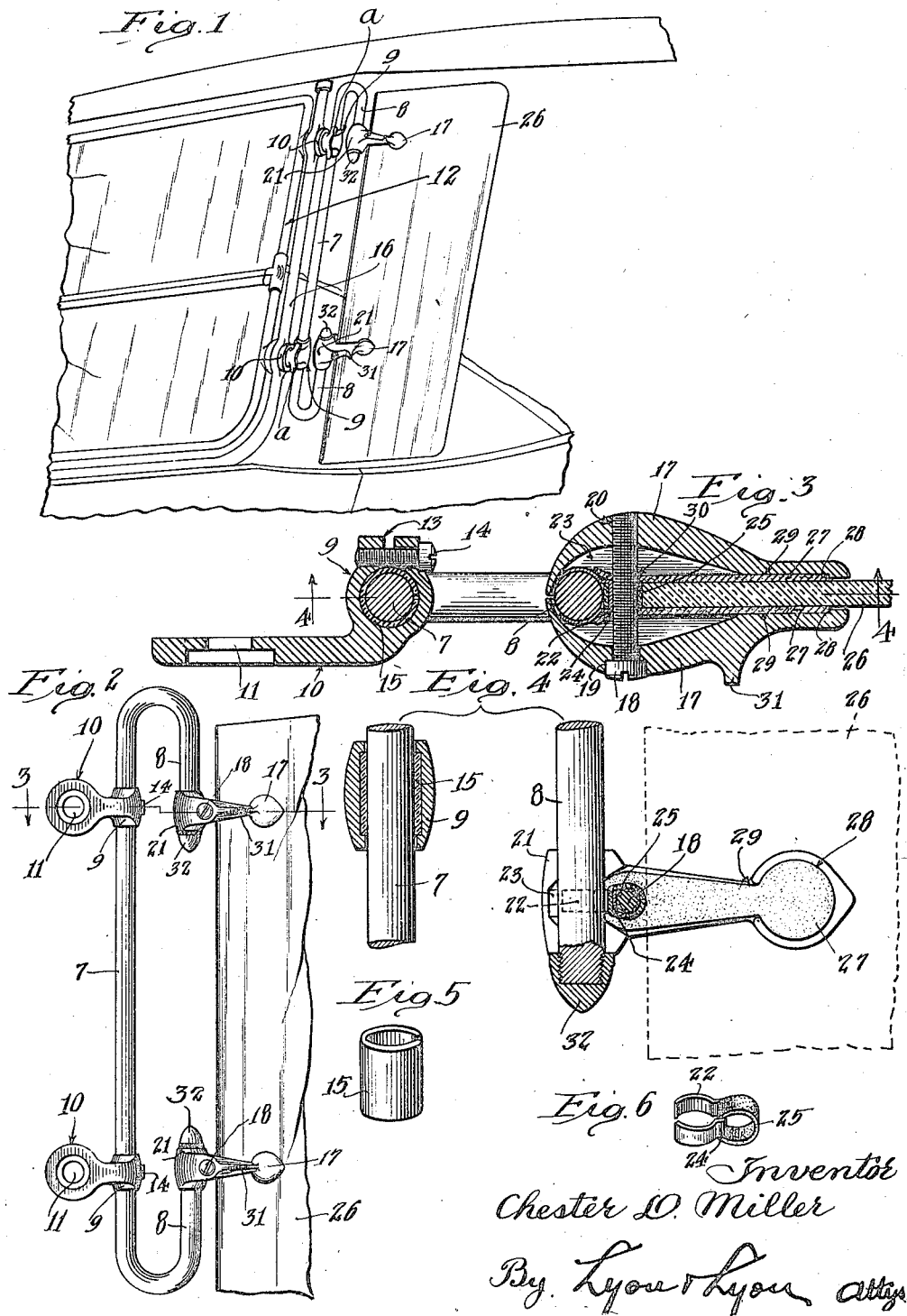
Inventor
Chester D. Miller
By Lyon & Lyon attys Patented Dec. 25, 1923.

1,478,671

UNITED STATES PATENT OFFICE.

CHESTER D. MILLER, OF LOS ANGELES, CALIFORNIA.

WIND DEFLECTOR.

Application filed March 21, 1922. Serial No. 545,478.

*To all whom it may concern:*

Be it known that I, CHESTER D. MILLER, a citizen of the United States, residing at Los Angeles, in the county of Los Angeles and State of California, have invented a new and useful Wind Deflector, of which the following is a specification.

This invention relates to wind deflectors of the type disclosed in my prior Patent No. 1,386,418, dated August 2nd, 1921, and an object of the invention, in general, is to improve the construction there disclosed.

More specifically objects of the invention are as follows:

To effect the mounting of the wind deflector on the pivots of the conventional wind shield;

To prevent slippage of the holder through the supporting brackets;

To improve the packing of the shield or deflecting member within the clamps;

To provide for contact between the clamps and the holder or brackets, when the shield member swings sufficiently far, so that the shield member will not strike the holder or brackets and thus be liable to be cracked or broken;

And to provide a spring bushing for the clamps that will yieldingly contact with the holder so that before the clamp screws are tightened the clamps will not slide out of their adjusted position along the holder.

The accompanying drawings illustrate the invention:

Figure 1 is a perspective view of a wind deflector constructed in accordance with this invention and mounted on a motor vehicle, a portion of which is also shown in perspective.

Fig. 2 is an enlarged elevation of the invention, a portion of the shield member being broken away to contract the view.

Fig. 3 is an enlarged plan section on the line indicated by 3—3, Fig. 2.

Fig. 4 is a fragmental elevation, partly in section on the line indicated by 4—4, Fig. 3.

Fig. 5 is a perspective view of the friction bushing.

Fig. 6 is a perspective view of the spring clamping member and cushioning sleeve.

Referring to the drawings, there is provided a clamp holder comprising a straight intermediate rod 7 and returns 8 extending parallel with the rod 7 and formed by bending the end portions of a rod into a U-shaped construction. The returns 8 are spaced but a comparatively short distance from the rod 7 for a purpose to appear hereinafter. The rod 7 is supported in bearings 9 of brackets 10. The brackets 10 are provided with counter sunk holes 11 to receive the pivots *a* of the conventional wind shield, indicated at 12, with which the wind deflector is associated, when in use.

The bearings 9 are split as indicated at 13 and screws 14 extend across the split so that when the screws are tightened the bearings are contracted about the rod 7. Between the bearings 9 and the rod 7 are inserted friction bushings 15, preferably formed of fiber or like material. When the screws 14 are tightened, there will be no danger of the holder slipping endwise or turning relative to the brackets 10.

Wind deflector holders of heretofore known construction are generally clamped to the wind shield post, indicated at 16, but the mounting described above is neater in appearance and is less liable to work loose, and the holder brackets cannot slide along the post.

The members 8 of the holder are provided with clamps of like construction and, therefore, but one of the clamps need be described. Each clamp comprises a pair of jaws 17 held together by a screw 18 which loosely engages a hole 19 in one of the jaws and adjustably engages a screw-threaded hole 20 in the other jaw.

Each jaw 17 is provided with a half-bearing 21 and the two halves, when the jaws are assembled, substantially embrace the holder member 8.

An important feature of the invention is the spring bushing 22 which partially encircles the associated holder member 8, said bushing being accommodated in complementary recesses 23 of the jaws. The spring bushing 22 is bent away from the holder member 8 to form an outstanding U-shaped portion 24 through which extends a resilient cushioning sleeve 25 formed of a suitable soft material, as rubber. The sleeve 25 surrounds the screw 18.

Abutting the sleeve 25 is a shield member or deflector 26, preferably constructed of transparent material such as glass. The shield member 26, prevented by the sleeve 25 from contact with the screw, is positioned between the jaws 17. The screw 18 not only clamps the bushing 22 upon the holder member 8 but also holds the jaws toward the shield member 26. Interposed between the jaws 17 and the shield member are resilient pads 27, preferably constructed of rubber. Ends of the pads 27 abut shoulders 28 formed in the inner faces of the jaws, said shoulders being defined by recesses 29 in which the pads lie. The pads are thicker than the depth of the recesses 29 so that no portion of the clamp jaws will come in contact with the shield member when the screw 18 is tightened.

The pads 27 are provided with holes 30 through which the screw 18 extends and said screw thus aids in retaining the pads in position in the jaws.

Hereinbefore reference was made to the rod 7 and members 8 of the holder being relatively close. In fact the distance between the rod 7 and members 8 is less than the length of the clamps so that when the clamps are swung on the holder toward the brackets 10 they will strike either the rod 7 or the brackets, according as to whether the brackets are positioned opposite to the clamps or not, thus limiting movement of the shield member 26 toward the brackets. The purpose of this is to prevent the shield member from being swung against the brackets, which would be liable to produce cracking or breakage of said shield member. Preferably the outermost jaw of each clamp, when the parts are in the positions shown in Figure 1, is provided with a boss 31 which projects sufficiently from the body portion of the jaw to insure against the shield member 26 striking the heads of the pivots a.

The holder members 8 are provided with removable heads 32 which may be screw-threaded or otherwise secured in place to prevent up and down motion of the shield member 26 on the holder.

From the foregoing it will be understood that, by loosening the screws 14, the holder may be adjustably mounted at any desired angle with relation to the conventional wind shield 12 and that, after such adjustment is made, the tightening of the screws will clamp the bushings 15 tightly upon the rod 7 so as to prevent turning or endwise slipping of the rod in the bearings 9. Adjustment of the shield member 26 can then be effected relative to the holder by grasping it and swinging it against the resistance produced by the frictional contact of the spring bushing 22 with the holder members 8.

The shield member 26 will be preferably assembled in the clamps after the clamps are in place on the holders and, in assembling the shield member, it is of advantage that the jaws 17 will stay in adjusted position on the holder while the shield member is being inserted between the jaws. This is effected by the spring bushings 22 which engage the holder members 8 with sufficient friction to hold the jaws 17 in position, even though the screws 18 are loosened sufficiently to permit the insertion of the shield member between the jaws.

I claim:

1. In a wind deflector, the combination of a shield member, a holder having spaced parallel portions, a pair of clamps clamped at one end to the shield member and having their opposite ends clamped to one of the parallel portions, and a pair of brackets secured to the other parallel portion of the holder and adapted to be secured to the conventional wind shield, the spacing of the parallel portions of the holder being less than the length of the clamps.

2. In a wind deflector, the combination of a shield member, a holder having spaced parallel portions, a pair of clamps clamped at one end to the shield member and having their opposite ends clamped to one of the parallel portions, and a pair of brackets secured to the other parallel portion of the holder and adapted to be secured to the conventional wind shield, the clamps having outstanding bosses adapted to form stops and spaced from the axis of the associated holder portion a distance equal to the distance between the axes of the parallel portions.

3. In a wind deflector, the combination of a holder, means to connect the holder with the conventional wind shield, clamp jaws each having a half-bearing, a split spring bushing in the half-bearings, the holder having a member partly encircled by the spring bushing, pads on the inner faces of the jaws, a shield member inserted between the pads, and a screw to draw the clamp jaws toward each other.

4. In a wind deflector, the combination of a holder, means to connect the holder with the conventional wind shield, clamp jaws each having a half-bearing, a split spring bushing in the half-bearings, the holder having a member partly encircled by the spring bushings, pads on the inner faces of the jaws, a shield member inserted between the pads, a screw to draw the clamp jaws toward each other, the split bushing having a portion bent away from the holder, and a cushioning sleeve on the screw engaging the bent portion of the bushing and engaging the inner edge of the shield member.

Signed at Los Angeles, California, this 25th day of February, 1922.

CHESTER D. MILLER.

Witnesses:
GEORGE H. HILES,
L. BELLE WEAVER.